United States Patent
Grimsland et al.

(10) Patent No.: US 6,623,347 B1
(45) Date of Patent: Sep. 23, 2003

(54) METHOD AND EQUIPMENT FOR THE PRODUCTION OF A GAS MIXTURE

(75) Inventors: Aage Grimsland, Larvik (NO); Bent Kloster Andreasen, Fredericia (DK)

(73) Assignee: Norsk Hydro ASA, Oslo (NO)

( * ) Notice: Subject to any disclaimer, the term of this patent is extended or adjusted under 35 U.S.C. 154(b) by 0 days.

(21) Appl. No.: 09/701,207

(22) PCT Filed: May 10, 1999

(86) PCT No.: PCT/NO99/00150
§ 371 (c)(1),
(2), (4) Date: Jan. 31, 2001

(87) PCT Pub. No.: WO99/60861
PCT Pub. Date: Dec. 2, 1999

(30) Foreign Application Priority Data

May 27, 1998 (NO) .......................................... 19982402

(51) Int. Cl.⁷ ................................................. A22B 3/00
(52) U.S. Cl. ........................................... 452/57; 452/66
(58) Field of Search .................................. 252/372, 373; 452/57, 66

(56) References Cited

U.S. PATENT DOCUMENTS

| | | | |
|---|---|---|---|
| 4,107,818 A | * 8/1978 | Scott et al. | ..................... 17/51 |
| 5,152,714 A | 10/1992 | Audsley et al. | ................ 452/66 |
| 5,435,776 A | 7/1995 | Owen et al. | .................. 452/66 |
| 5,653,629 A | 8/1997 | Audsley et al. | ................ 452/66 |
| 6,174,228 B1 | * 1/2001 | Grimsland et al. | ........... 452/66 |

FOREIGN PATENT DOCUMENTS

| WO | 94/15469 | 7/1994 | |
|---|---|---|---|
| WO | WO 98/31231 | * 7/1998 | ............ A22B/3/00 |

* cited by examiner

Primary Examiner—Stanley S. Silverman
Assistant Examiner—Jonas N. Strickland
(74) Attorney, Agent, or Firm—Wenderoth, Lind & Ponack, L.L.P.

(57) ABSTRACT

A method and apparatus for producing and maintaining a gas mixture in one or more phases, in which the phases are generated in zones of, for example, a stunning tunnel or a stunning shaft. The gas mixture includes carbon dioxide gas and oxygen gas, and the concentration of air is maintained at a level equivalent to a concentration level in air. Carbon dioxide is added based on the measured level of carbon dioxide in each zone.

14 Claims, 5 Drawing Sheets

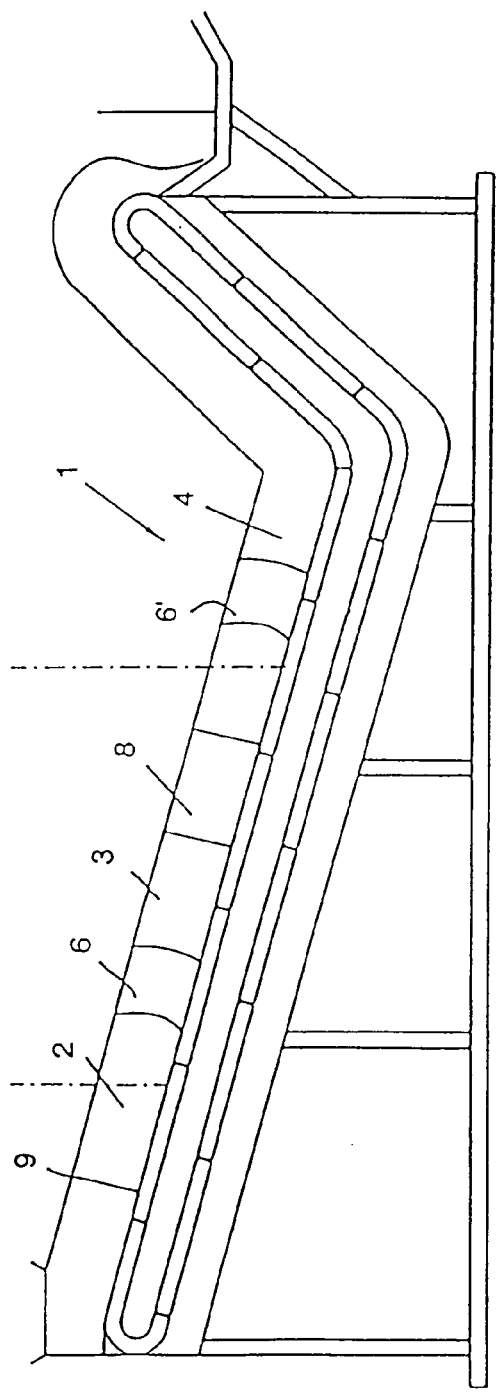
Fig. 1A
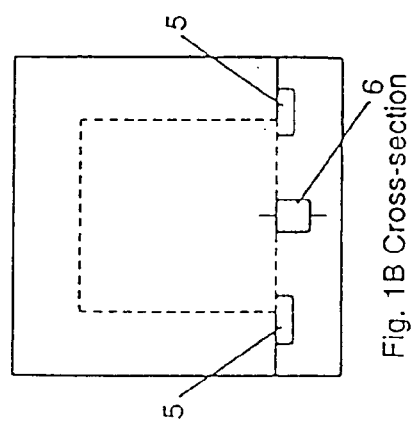
Fig. 1B Cross-section

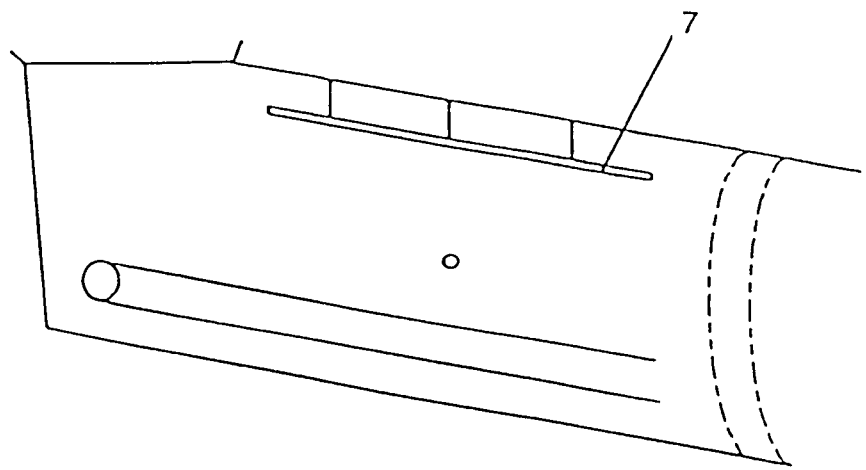
Fig. 2A Longitudinal section
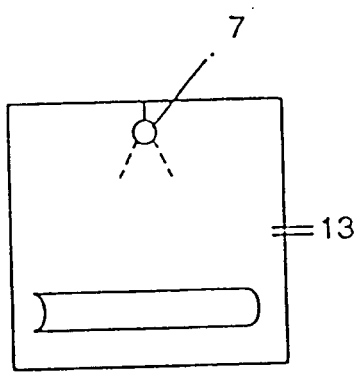
Fig. 2B Cross-section
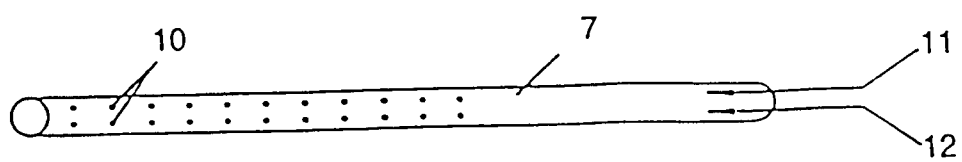
Fig. 2C

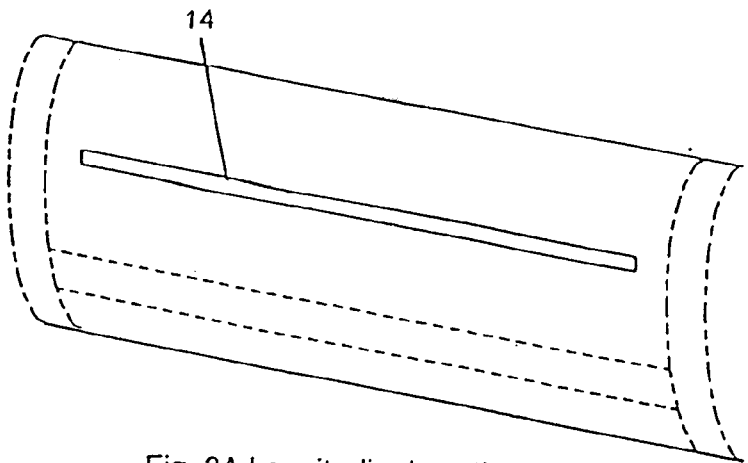
Fig. 3A Longitudinal section
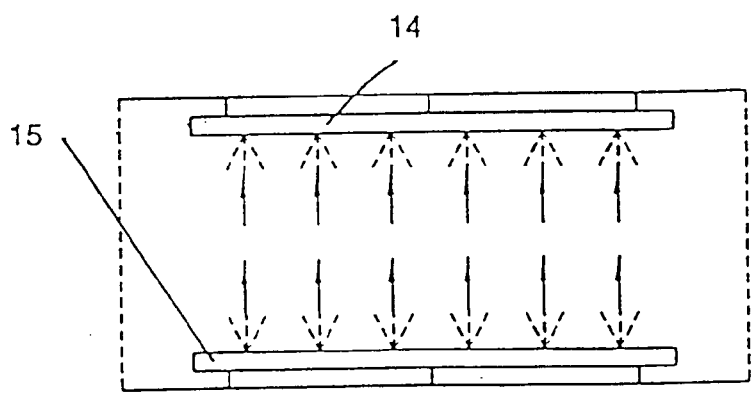
Fig. 3B Top section
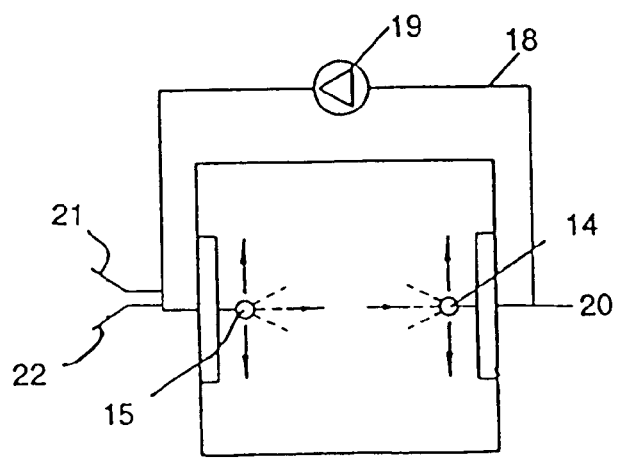
Fig. 3C Cross-section

METHOD AND EQUIPMENT FOR THE PRODUCTION OF A GAS MIXTURE

BACKGROUND OF THE INVENTION

The present invention concerns a method and equipment for the production and maintenance of a gas mixture in one or more chambers, to be used mainly in connection with the treatment of animals and, in particular, for use in connection with poultry.

More specifically, the present invention is related to treatment such as stunning or killing poultry, and may expediently be used in connection with the applicant's previous patent application PCT/N097/00331, which describes the use of gas mixtures containing mainly a constant, natural level of $O_2$ concentration, whereby the concentration of $CO_2$ may be varied in accordance with a further specified process during treatment. Such treatment may take place by varying the $CO_2$ concentration continuously or in stages. Treatment in stages may preferably take place in three phases, which is, moreover, stated using examples in the above patent application.

In the following, a brief description will be given of how the gas treatment of poultry in three phases may take place:

Phase 1

This is an introductory phase in which the animals are made accustomed to an atmosphere which is different than a normal atmosphere. The purpose is to expose the animals to a low concentration of $CO_2$ which causes no discomfort but which nevertheless appears to have a certain calming effect. It has been observed in many tests that this phase is decisive for how the animals react to the next phase. They behave very calmly in phase 2 if they have received the correct pretreatment, which is the purpose of phase 1. The dwell time in phase 1 is 30–40 seconds. Phase 1 may have the following atmosphere:

| 18–20% | $CO_2$ |
| 18–22% | $O_2$ |
| 58–64% | Air |

Phase 2

The actual stunning starts in this phase and the animals become completely relaxed and fall asleep. The atmosphere is changed further by the addition of more $CO_2$. In this phase, the oxygen plays a very important role. If the oxygen concentration is too low, the animals become agitated with a lot of spasms. If the concentration is too high, however, it is more difficult to stun the animals. Our experience shows that the oxygen concentration should be close to that of a normal atmosphere. Dwell time is 40–50 seconds.

| 33–35% | $CO_2$ |
| 18–22% | $O_2$ |
| 43–49% | Air |

In this phase, the required $CO_2$ concentration may vary beyond the recommended levels, depending on the type of animal and the size of the animals. The conditions must be regulated to meet individual requirements.

Phase 3

After phase 2, the animals are slightly stunned but will wake up again after a very short time. Phase 3 must therefore stun the animals more deeply so that it takes longer for them to wake up. The atmosphere is changed further by the addition of more $CO_2$. The dwell time in phase 3 must be 30–40 seconds.

| 54–60% | $CO_2$ |
| 18–22% | $O_2$ |
| 18–28% | Air |

The required $CO_2$ concentration may vary in this phase as well, depending on the type of animal and depending on whether the animals are to be stunned deeply or killed. Recently, we have also found out that the requirements for the quantity of $O_2$ in this phase may be reduced down towards 10%, depending on the type of animal (for example, chicken) which is to be treated.

U.S. Pat. No. 5,653,629 relates to the slaughter of poultry in an oxygen-depleted atmosphere, in which the poultry is held in the atmosphere for a sufficient period of time to lose consciousness and then to die. The method is a one chamber method based upon stunning in an atmosphere with an extremely low oxygen concentration, such as less than 2% oxygen. In the examples, different compositions of atmospheres for batchwise treatment of the poultry are provided. In example 4, an oxygen concentration of 5% is indicated as being too high to achieve satisfactory stunning results. Further, no indications are given in the disclosure about how the desired atmosphere should be maintained during an industrial, continuous stunning process. In fact, this disclosure does not relate to the basic principles of the present application, where the poultry are exposed to a mainly normal level of oxygen. concentration during the stunning process, which in addition may involve plural atmospheres of treatment.

U.S. Pat. No. 5,152,714 is another example of anoxic poultry stunning where the gas mixture contains less than 2% oxygen.

The present invention is in particular suited for performance in relation to the principles given in the Applicant's own patent application PCT/N097/00331, which is a non-oxygen depleted process for the treatment of poultry (i.e. the oxygen level is mainly at the natural level in the stunning gas mixtures). The treatment of animals with a gas mixture having a rather natural oxygen content is believed to be more humane than the prior art gas mixtures, because it is not a low level of oxygen that gives the stunning effect. It is rather the level of the carbon dioxide concentration that is the effective parameter in this sense.

WO 94/15469 relates to two-chamber stunning of poultry in which a stunning gas or gas mixture via a shut-off valve can be portioned to a mixing chamber. In addition, oxygen from a reservoir can be led to the same mixing chamber via another shut-off valve. Further, a portion of the gas can be transferred from one chamber to the other. This publication does not teach adding oxygen as a function of the carbon dioxide concentration measured in the gas from the zone(s), and also does not teach that the control of the oxygen addition can be of volumetric type. Further, it does not teach what the oxygen concentration should be in the second chamber.

SUMMARY OF THE INVENTION

The present invention describes a method and equipment for supplying and regulating the gas composition in the different phases of treatment. The present invention also ensures that it is easy to maintain the desired concentration in different zones of the stunning equipment in connection with treatment in stages and; on the other hand, to maintain the desired gas concentration during treatment by continuously changing the $CO_2$, concentration. Moreover, the present invention contributes to the gas mixture/concentration being uniform throughout the zone (chamber/section) in which the animals are located during treatment. The above conditions are important parameters for achieving uniform quality of treatment of the animals so that all the animals are in the same state after treatment (stunned or killed). The treatment method has been specially developed with a view to reversible stunning, in which there are strict requirements for good control in connection with the gas mixtures in question if the animals are to be returned to their original state.

BRIEF DESCRIPTION OF THE DRAWINGS

The present invention will be described in the following by means of examples and figures in which:

FIG. 1A shows a stunning tunnel with three treatment zones;

FIG. 1B shows a cross-section of the tunnel and details of a transport system;

FIG. 2A shows a longitudinal section of details of the tunnel shown in FIG. 1A;

FIG. 2B shows a cross-section of the tunnel shown in FIG. 1A;

FIG. 2C shows details of a nozzle device;

FIG. 3A shows a longitudinal section of part of the tunnel shown in FIG. 1A;

FIG. 3B shows a top section of part of the tunnel shown in FIG. 1A;

FIG. 3C shows a cross-section of part of the tunnel shown in FIG. 1A;

DETAILED DESCRIPTION OF THE INVENTION

Figure 4:
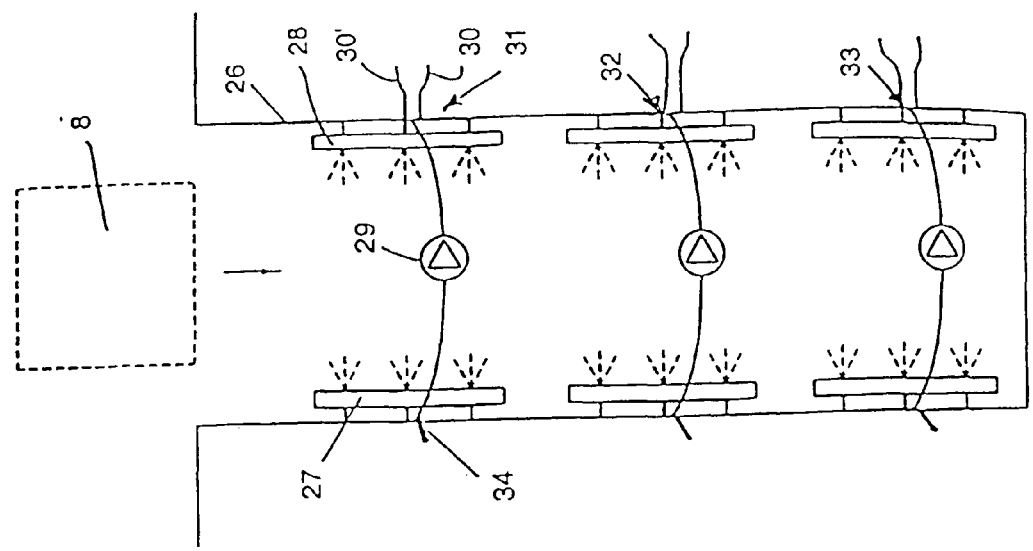
FIG. 4A shows a section of a system for the creation of up to three different gas mixtures in one chamber.
FIG. 4B shows a section of a shaft with means for the production of gas mixtures at different vertical levels.
Figure 4:
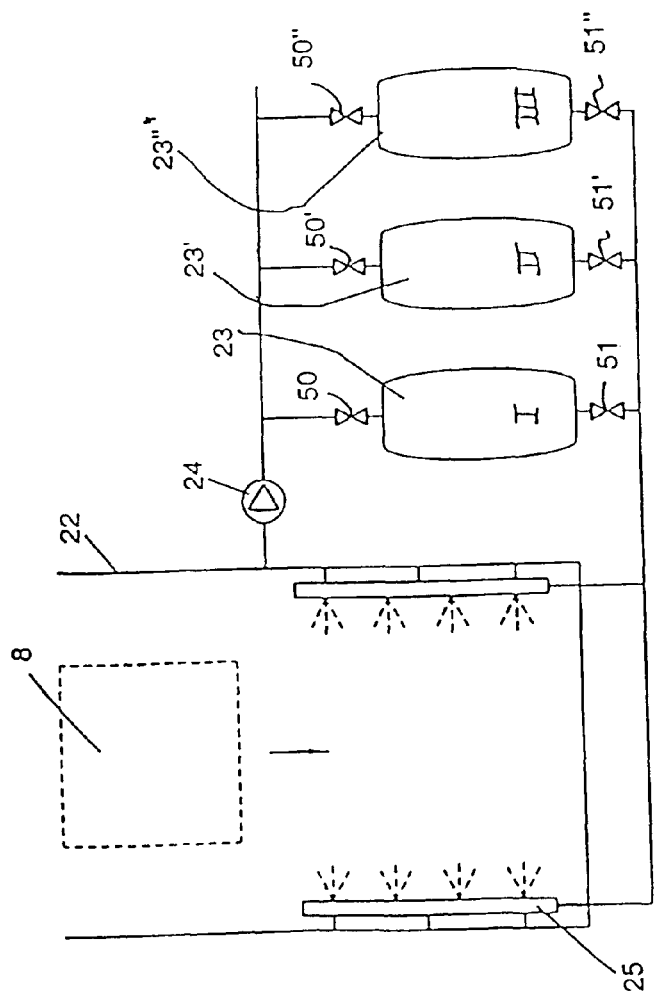

The stunning tunnel 1 in FIG. 1A is as described in the applicant's previous patent application. The present application concerns a solution involving equipment and a method for creating and regulating the gas level in each individual zone 2, 3, 4. The equipment is designed to ensure that it is easier to maintain the desired concentration in each zone and that the concentration is uniform throughout the zone. The circulation which is described for the three zones 2, 3, 4 is also designed, together with means of separation or lamellar curtains 6, 6' between the zones, to ensure minimal leakage of gas between the zones.

In the first zone 2, there will seldom be a need to add $CO_2$ and $O_2$ because the concentration must be low and there is a certain back-flow from the second zone 3. However, means for producing and regulating the gas level must be arranged. This can be done simply using the following equipment.

A nozzle device 7 placed in the roof of the tunnel (FIG. 2A) is parallel to the longitudinal direction of the tunnel. The nozzle device is designed so that it spreads the gas over the belt or the cages in which the animals are located. The nozzle device 7 is shown in cross-section in FIG. 2B. As an alternative option (not shown) the nozzle device can be arranged in the transverse direction of the tunnel.

The nozzle device 7 itself, see FIG. 2C, is simply made from a pipe which is sealed at both ends. Holes 10 are drilled and arranged parallel to the longitudinal direction of the nozzle device and the gas can flow out of these holes. The nozzle device 7 is connected to a gas supply 11 for $CO_2$ and a gas supply 12 for $O_2$, which are supplied via the regulation unit. The regulation unit for the control and supply of gas will be described later.

Sample nozzle 13 for supplying return/control gas (FIG. 2B) to the regulation unit is located in the center of the section at the animals head height so that gas can be sucked back for analysis. The analysis results control the addition of more gas. $CO_2$ and $O_2$ are added at the same time through the same nozzle device because there must be a given ratio between these gases at all times.

In the second zone 3 (FIG. 1A), the actual stunning begins and it is important to keep an accurate, uniform gas concentration throughout the zone. It is also important to have as little gas leakage as possible from zone 3 to zones 2 and 4.

Optimal concentration and distribution of gas and minimal gas spread to the other chambers are achieved as follows:

A circulation nozzle device 14, 15 (FIGS. 3A, 3B, 3C) is placed on each of the side walls of the zone 3 in the longitudinal direction of the tunnel. The circulation nozzle devices 14, 15 are designed in the same way as in the first zone 2 and can be raised and lowered independently of one another so that the gas flow conditions can be changed (FIG. 3C).

The circulation nozzle devices 14, 15 are connected to one another via a pipe system 18 (FIG. 3C) and a circulation pump 19 so that the gas can be circulated. The gas is sucked into a first circulation nozzle device 14 and blown out via a second circulation nozzle device 15. The purpose of such circulation is to obtain more uniform gas distribution in the second zone 3. The circulation will also contribute to less leakage of gas to the other, adjacent zones 2 and 4. It should be understood however, as an alternative arrangement (not shown), the gas circulation can be forced in the longitudinal or in the vertical direction of the tunnel zones by appropriate means.

A sample outlet 20 for supplying return/control gas to the regulation unit is located in the circulation system on the suction side opposite the first nozzle device (FIG. 3C). This control gas constitutes a very small quantity of the circulation gas, and is sucked into the regulation unit (to be mentioned later) for analysis, the results of which control the addition of gas to the system.

Supply pipes 21, 22 for $CO_2$ and $O_2$ are connected to the circulation system on the blowing side just before the nozzle device 15 (FIG. 3C). The addition of gas is controlled by the regulation unit, which will be described later.

$CO_2$ is added as a function of the $CO_2$ concentration measured in the gas from the second zone 3, while the $O_2$ is added as a function of the quantity of $CO_2$ which is added. Alternatively, $O_2$ can be added as a function of the $O_2$ concentration measured in the gas from the second zone 3.

The third zone 4 is shown in FIG. 1A. This zone can be equipped in the same way as the first zone 2, but the nozzle devices are adapted to the curvature of the tunnel 1 (not shown).

The tunnel, which is described in the applicant's previous application, has a belt conveyor 9 which conveys the animals either freely or in transport boxes 8.

The tunnel can easily be modified with a simpler transport arrangement which involves the transport boxes 8 being pulled through the tunnel 1 on two fixed rails 5 (FIG. 1B). A single chain with dogs 6 pulls the box or cage along with it through the three zones of the tunnel.

The tunnel can be equipped with a powerful extractor fan which starts automatically if someone opens inspection or washing doors (not shown). Moreover, this may be controlled by the regulation unit.

The present invention will also be described in connection with another version of stunning equipment, as shown in FIG. 4A. This version comprises a shaft 22 in which a cage 8 containing animals to be treated is lowered. The gas is added to the shaft in three phases as follows: The shaft 22 is connected to three separate gas tanks 23, 23', 23", each of which contains a gas mixture equivalent to the gas prescribed for each of the three treatment phases.

Gas is circulated between the first tank 23 and the shaft for the prescribed time in order to perform phase 1 of the stunning. The circulation is created by a fan 24 sucking gas from the shaft and blowing it into the tank 23. Gas from the tank 23 is then pressed back to the shaft via the nozzle device 25. Gas is then circulated between the second tank 23' and the shaft 22 according to the same principle. Finally, gas is circulated between the third tank 23" and the shaft 22, also according to the same principle.

Each tank is equipped with isolation valves 50, 50', 50" and 51, 51', 51" which can be opened/closed in accordance with the type of gas mixture which is to be conducted into the shaft.

The concentration in each container 23, 23', 23" is controlled via a regulation unit which will be described later. $CO_2$ and $O_2$ are added to each tank when the regulation unit indicates that there is a need for more gas. When the circulation in phase 3 has been completed, some extra gas is sucked back to the tank 23 so that the start concentration is not too high when the treatment of a new cage begins.

Another alternative is to build a deep shaft 26, see FIG. 4B. The cage 8 can be lowered and kept at various vertical levels in accordance with a predefined pattern. The upper part of the shaft corresponds to phase 1, the central part to phase 2 and the lower part to phase 3. In a first gas circulation unit, a nozzle device 27 is connected to an opposite nozzle device 28 in a circulation system with a pump 29. The gas supply 30, 30' for $CO_2$ and $O_2$ comes from the regulation unit, which will be described later, and is connected to the circulation's blowing side close to the nozzle device 28. The sample outlet 34 for or the return/control gas is located in the suction side of the circulation. The central gas circulation unit 32 and lower gas circulation unit 33 work according to the same principle, but the gas concentrations will correspond to phases 2 and 3, respectively, in the stunning process.

The stunning takes place by the cage 8 being lowered to the first gas circulation unit 31. After the described dwell time, the cage is lowered to the second gas circulation unit 32 and finally to the bottom, the third gas circulation unit 33. Finally, the cage is quickly lifted out and the shaft is ready for the treatment of a new cage.

Figure 5:
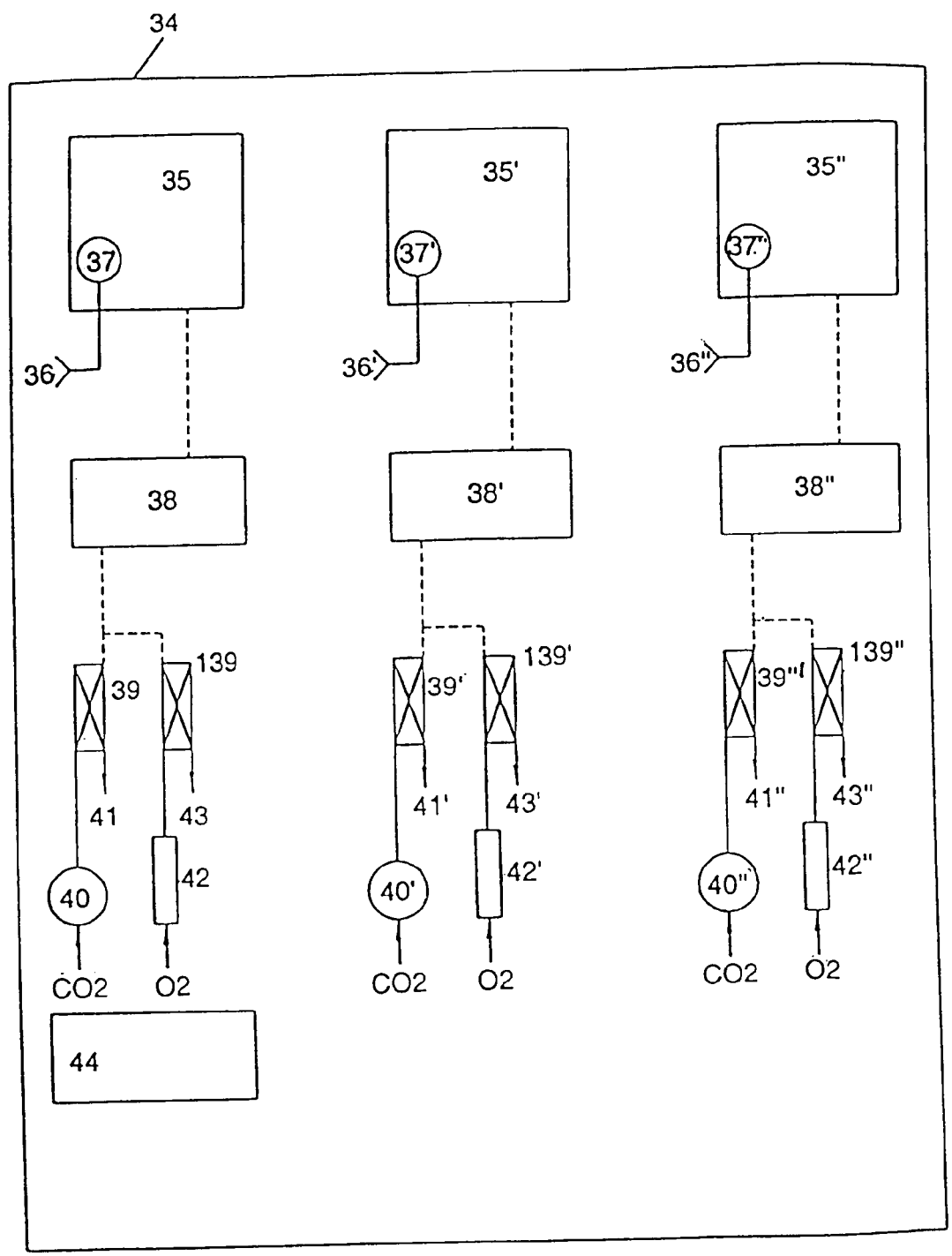
FIG. 5 shows a diagram of equipment with means of regulation for the production of one or more gas mixtures.

In the following, the regulation equipment will be described with reference to FIG. 5. Regardless of the type of technical arrangement (tunnel, shaft, etc.) used in connection with the method, it is necessary to have a suitable system/suitable equipment for gas regulation. The purpose of this equipment is to continuously analyse the gas concentration in the different sections and to regulate the addition of gas on the basis of the analysis results.

The regulation unit is designed to modify the stunning atmosphere on the basis of desired parameters. $CO_2$ is the active gas in the process and its addition is controlled by the measured concentration in each individual zone. $O_2$ is a secondary gas and it is necessary to strive to maintain a normal level for this gas component. The need to add $O_2$ depends on the quantity of $CO_2$ added and can thus be controlled volumetrically on the basis of this quantity. As an alternative, $O_2$ is controlled by the measured concentration in each individual zone, and can be added automatically.

The regulation equipment is contained in a cabinet 34. The cabinet is located as close to the zones as possible in order to limit the distance over which the return/control gas is conveyed. The cabinet 34 includes three $CO_2$ meters 35, 35', 35", one for each zone. The meters are each connected to their stunning zone via a hose 36, 36', 36", and they are equipped with a pump 37, 37', 37" which sucks gas from the section into the measuring unit. The gas may, for example, be sucked from outlet 13 in FIG. 2B, outlet 20 in FIG. 3C or outlet 34 in FIG. 4B. $CO_2$ flows through the meters 35, 35', 35" continuously and is continuously analysed for each zone. The analysis results are transferred directly to a regulator 38, 38', 38". Each meter 35, 35', 35" with a regulator 38, 38', 38" controls its own phase in the stunning process.

As shown, the three regulators 38, 38', 38" are located in the cabinet and each is connected on one side to its own $CO_2$ meter. In turn, each regulator 38, 38', 38" is connected to its own set of (2) solenoid valves 39, 139, 39', 139', 39", 139". Each regulator can be set to the desired level of $CO_2$ concentration. If the $CO_2$ concentration indicated by the meter 35 is lower than the set level, a signal is sent to the solenoid valves 39, 139 that they are to open. If the concentration of $CO_2$ is higher than or equal to the set level, the solenoid valves are kept closed. Each set of solenoid valves 39, 139 (2) controls the supply of $CO_2$ and $O_2$ to its own zone. $CO_2$ is supplied via a pressure regulator 40 to the solenoid valve 39 and is conducted from the solenoid valve via a pipe 41 to the stunning zone, for example to inlet 11 in FIG. 2C, inlet 21 in FIG. 3C or inlet 30 in FIG. 4B. $O_2$ is supplied via a volume regulator 42 to the solenoid valve 139, and is conducted from the solenoid valve to the stunning zone via a pipe 43 which can be connected to inlet 12 in FIG. 2C, inlet 22 in FIG. 3C or inlet 30' in FIG. 4B.

If the solenoid valves 39, 139 are open, both $CO_2$ and $O_2$ are supplied. The quantity of $O_2$ can be regulated according to the desired mixture ratio in relation to $CO_2$. This can be done by changing the $O_2$ supply via the volume regulator.

The regulation cabinet 34 must also have room for supplementary and safety equipment 44, which may comprise:

Cut-out functions for emergency stop and door openers (washing/inspection doors).

Start of emergency fans.

Control of extractor fans for free gas.

Emergency warnings of high $CO_2$ content in the room.

It should be understood that if $O_2$ is added in the alternative manner i.e. as a function of the measured $O_2$ concentration, the control system for supplying this gas component will be similar to that of $CO_2$ in the above described embodiment, comprising $O_2$ meters connected with corresponding regulators controlling the solenoid valves (not shown).

Further, the gas analysing and mixing system can be run automatically to ensure that the desired concentrations of both gases are kept within certain limits by means of a computerbased system analysing and controlling the gas addition.

What is claimed is:

1. A method of producing and maintaining a gas mixture for the treatment of animals, comprising:

providing a gas mixture including carbon dioxide, oxygen, and air, wherein a concentration of oxygen in the gas mixture is in a range of 10% to 22%;

adding carbon dioxide to the gas mixture based on a measured carbon dioxide concentration level in the gas mixture; and adding oxygen to the gas mixture based on one of the amount of carbon dioxide added to the gas mixture and a measured oxygen concentration level in the gas mixture.

2. The method of claim 1, wherein said adding of the oxygen to the gas mixture comprises adding a volume of oxygen to the gas mixture based on the amount of carbon dioxide added to the gas mixture.

3. The method of claim 2, wherein said adding of the carbon dioxide to the gas mixture comprises controlling an amount of carbon dioxide added using regulating equipment.

4. The method of claim 3, further comprising:

supplying the gas mixture into a zone at a first side of the zone; and sucking the gas mixture out of the zone from a second side of the zone opposite the first side such that the gas mixture flows through the zone.

5. The method of claim 3, further comprising:

supplying the gas mixture into a chamber;

sucking at least a portion of the gas mixture through an outlet of the chamber; and analyzing the at least a portion of the gas mixture sucked out of the chamber so as to measure the carbon dioxide concentration level of the gas mixture.

6. The method of claim 1, further comprising:

supplying the gas mixture into a zone at a first side of the zone; and sucking the gas mixture out of the zone from a second side of the zone opposite the first side such that the gas mixture flows through the zone.

7. The method of claim 1, further comprising:

supplying the gas mixture into a chamber;

sucking at least a portion of the gas mixture through an outlet of the chamber; and analyzing the at least a portion of the gas mixture sucked out of the chamber so as to measure the carbon dioxide concentration level of the gas mixture.

8. The method of claim 1, further comprising supplying the gas mixture to three adjacent zones, wherein said adding of the carbon dioxide comprises adding carbon dioxide to the gas mixture in each zone such that the carbon dioxide concentration levels in the three adjacent zones are different.

9. An apparatus for producing and maintaining a gas mixture, including carbon dioxide, oxygen, and air, to be used for the treatment of animals, comprising:

at least one zone for receiving the gas mixture;

a carbon dioxide meter for measuring a carbon dioxide concentration level of the gas mixture in said at least one zone, and for generating a carbon dioxide concentration signal based on the measured carbon dioxide concentration level;

a carbon dioxide supply source including a stop valve, said carbon dioxide supply source communicating with said at least one zone for supplying carbon dioxide into said at least one zone;

an oxygen supply source including a stop valve, said oxygen supply source communicating with said at least one zone for supplying oxygen into said at least one zone; and a regulator for receiving the carbon dioxide concentration signal from said carbon dioxide meter, said regulator being operable to open and close said stop valve of said carbon dioxide supply source based on the carbon dioxide concentration signal so as to control a flow of carbon dioxide into said at least one zone, and said regulator being operable to open and close said stop valve of said oxygen supply source based on one of an amount of carbon dioxide added to said at least one zone and a measured oxygen concentration level in said at least one zone so as to control a flow of oxygen into said at least one zone such that a concentration of oxygen in the gas mixture in said at least one zone is in a range of 10% to 22%.

10. The apparatus of claim 9, further comprising:

a first nozzle fitted on a first side of said at least one zone for supplying the gas mixture into said at least one zone; and a second nozzle fitted on a second side of said at least one zone opposite said first side for supplying the gas mixture into said at least one zone.

11. The apparatus of claim 9, further comprising a stunning tunnel divided into three zones for receiving the gas mixture.

12. The apparatus of claim 9, further comprising:

a stunning shaft including one zone; and a plurality of tanks communicating with said stunning shaft, each of said tanks containing a predefined gas mixture.

13. The apparatus of claim 9, further comprising a vertical stunning shaft including three zones arranged at different vertical levels of said vertical stunning shaft.

14. The apparatus of claim 9, wherein said regulator is operable to open and close said stop valve of said oxygen supply source so as to add a volume of oxygen to the gas mixture based on the amount of carbon dioxide added to the gas mixture.

* * * * *